United States Patent [19]

McKay

[11] 4,169,042

[45] Sep. 25, 1979

[54] CRACKING PROCESS AND CATALYST FOR SAME CONTAINING TELLURIUM

[75] Inventor: Dwight L. McKay, Bartlesville, Okla.

[73] Assignee: Phillips Petroleum Company, Bartlesville, Okla.

[21] Appl. No.: 886,030

[22] Filed: Mar. 13, 1978

[51] Int. Cl.² .................... C10G 11/02; B01G 8/24; B01G 27/02; C10G 9/16

[52] U.S. Cl. ............................ 208/113; 208/48 AA; 208/52 CT; 252/411 R; 252/439

[58] Field of Search ................. 208/108, 113, 114–124

[56] References Cited

U.S. PATENT DOCUMENTS

| | | | |
|---|---|---|---|
| 2,129,693 | 9/1938 | Houdry | 208/119 |
| 2,511,453 | 6/1950 | Barry | 260/677 |
| 3,491,162 | 1/1970 | Bloch | 260/671 |
| 3,494,970 | 2/1970 | Pharis | 260/671 |
| 3,583,903 | 6/1971 | Miale et al. | 208/120 |
| 3,711,422 | 1/1973 | Johnson et al. | 252/414 |
| 4,025,458 | 5/1977 | McKay | 208/120 |
| 4,111,845 | 9/1978 | McKay | 208/120 |

Primary Examiner—Delbert E. Gantz
Assistant Examiner—G. E. Schmitkons

[57] ABSTRACT

A novel cracking catalyst, a method of preparing same and an improved hydrocarbon cracking process are provided wherein adverse effects of metals such as nickel, vanadium and iron in the cracking catalyst are precluded or mitigated by contacting the cracking catalyst with at least one treating agent selected from the group consisting of elemental tellurium, oxides of tellurium and compounds convertible to elemental tellurium or oxide thereof during cracking or catalyst regeneration, whereby to said cracking catalyst is added a modifying amount of said treating agent.

17 Claims, No Drawings

CRACKING PROCESS AND CATALYST FOR SAME CONTAINING TELLURIUM

This invention relates to cracking of a hydrocarbon feedstock.

Hydrocarbon feedstock containing higher molecular weight hydrocarbons is cracked by contacting it at an elevated temperature with a cracking catalyst whereby light distillates such as gasoline are produced. However, the cracking catalyst gradually deteriorates during this process. One reason for this deterioration is the deposition of contaminating metals such as nickel, vanadium, and iron on the catalyst, resulting in increased production of hydrogen and coke and decreased catalyst activity for cracking. Furthermore, the conversion of hydrocarbons into gasoline is reduced by these metals. Therefore, there is a need for a cracking process or a modified cracking catalyst which will prevent or reduce the deleterious effects of these metal contaminants.

It is thus an object of the present invention to provide an improved catalytic cracking process.

Another object of this invention is to provide a process for the passivation of contaminating metals deposited on a cracking catalyst.

Another object of this invention is to provide a process for restoration of used cracking catalyst.

Another object of this invention is to provide a modified cracking catalyst.

Another object of this invention is to provide a cracking catalyst which provides high yields and selectivity for gasoline or higher-boiling hydrocarbon fuel.

Other aspects, objects and the several advantages of the invention will be readily apparent to one skilled in the art from the following disclosure and the appended claims.

In accordance with this invention, I have discovered that the adverse effects of nickel, vanadium and iron on cracking catalyst can be precluded or reduced by contacting the cracking catalyst with at least one treating agent selected from the group consisting of elemental tellurium, oxides of tellurium and compounds convertible to elemental tellurium or oxide thereof during cracking or catalyst regeneration, whereby to the cracking catalyst is added a modifying amount of the treating agent.

Addition of the treating agent in accordance with the present invention to the cracking catalyst either prior to, during or after its use achieves an increase in catalyst activity, an increase in the yield of gasoline or higher-boiling hydrocarbon fuels, and a decrease in the production of hydrogen.

In accordance with one embodiment of this invention, a novel cracking catalyst is provided that has been prepared by contacting a conventional cracking catalyst with a tellurium-containing treating agent in an amount and in a manner as herein described.

Examples of some tellurium-containing treating agents which can be employed to contact the cracking catalyst are those selected from the group consisting of elemental tellurium, tellurium monoxide, tellurium dioxide, tellurium trioxide, tellurous acid, telluric acid, tellurium methoxide, and tellurium ethoxide, as well as mixtures thereof. Elemental tellurium is the treating agent presently preferred.

The term "cracking catalyst" as used herein refers either to new or used cracking catalyst materials that are useful for cracking hydrocarbons in the absence of added hydrogen. The cracking catalyst referred to can be any conventional cracking catalyst.

Such cracking catalyst materials can be any of those cracking catalysts conventionally employed in the catalytic cracking of hydrocarbons boiling above 400° F. (204° C.) for the production of gasoline, motor fuel, blending components and light distillates. These conventional cracking catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention. Examples of cracking catalysts into or onto which tellurium can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in particulate form having a particle size principally within the range of about 10 to about 200 microns.

If desired, the cracking catalyst can contain a combustion promoter such as platinum or chromium.

The unused catalytic cracking material as employed in the present invention contains essentially no nickel, vandium or iron. Particularly and preferably, the nickel, vanadium and iron metals content of the unused catalytic cracking material which constitutes the major portion of the unused cracking catalyst of this invention is defined by the following limits:

nickel: 0 to 0.02 weight percent
vanadium: 0 to 0.06 weight percent
iron: 0 to 0.8 weight percent.

The weight percentages in this table relate to the total weight of the unused catalytic cracking material including the metals nickel, vanadium and iron, but excluding the added tellurium modifying agents. The contents of these metals on the cracking catalyst can be determined by standard methods well known in the art, e.g., by atomic absorption spectroscopy or by X-ray fluorescence spectroscopy.

The catalytic cracking materials can vary in pore volume and surface area. Generally, however, the unused cracking catalyst will have a pore volume in the range of about 0.1 to about 1 ml/g. The surface area of this unused catalytic cracking material generally will be in the range of about 50 to about 500 m$^2$/g.

The modified catalyst of this invention consists essentially of a conventional cracking catalyst having a modifying or passivating amount of tellurium-containing treating agent therein or thereon. Such "modifying amount" is that amount sufficient to preclude or reduce the adverse effects of the nickel, iron or vanadium metals.

The manner in which the conventional cracking catalyst is contacted with the modifying or treating agent is not critical. For example, the agent in finely divided form can be mixed with the conventional cracking catalyst in ordinary manner such as by rolling, shaking, stirring or the like. Alternatively, the treating agent can be dissolved or dispersed in a suitable liquid, e.g., water, hydrocarbon or aqueous acid, depending in part on the particular modifying agent used, and the resulting solution or dispersion can be used to impregnate the conventional cracking catalyst, followed by volatilization of the liquid, or the modifying agent can be precipitated onto the catalyst from a solution of the treating agent in different chemical form, followed by solvent removal. If desired, the modifying agent can be dissolved or dispersed in the hydrocarbon feedstock to the cracking process, in which instance the hydrocarbon feedstock and the treating agent contact the cracking catalyst at about the same time. Also, if desired, the cracking catalyst can be exposed to the treating agent in vapor form to deposit the agent on the catalyst. Of course, combinations of the various methods can be employed to achieve modification of the catalyst with the treating agent.

Although the ratio of treating agent to conventional cracking catalyst can vary over a wide range, depending in part on the concentration of contaminating metals on the catalyst and in the hydrocarbon feedstock to be cracked, the treating agent generally will be used in an amount such as to provide within the range of about 0.005 to about 5, preferably about 0.02 to about 2, parts by weight of tellurium per 100 parts by weight conventional cracking catalyst, i.e., including any contaminating metals in the catalyst but excluding the treating agent.

The form in which tellurium is employed in the preparation of the tellurium-containing catalysts is not critical. Thus, elemental tellurium, inorganic tellurium compounds, and organic tellurium compounds, as well as mixtures thereof, are suitable sources of tellurium. The term "tellurium" generally refers to any one of these tellurium sources.

Since the main purpose of tellurium on the catalytic cracking material is to prevent or mitigate the otherwise (without tellurium) occurring undesirable effects of contaminating metals, in particular the increased hydrogen production and the reduced yield of gasoline or higher-boiling hydrocarbon fuels such as kerosene, diesel fuel and burning oils caused by these contaminating metals, the sources of tellurium utilized and incorporated into or onto the cracking catalyst should be essentially free of contaminating metals. The tellurium sources thus should essentially contain no nickel, no vanadium and no iron.

The tellurium-containing catalyst can be prepared by contacting the conventional catalytic cracking material with the tellurium treating agent. Prior to or during use in the cracking process the tellurium-containing catalyst is heated to an elevated temperature, e.g., within the range of about 800° F. (427° C.) to about 1500° F. (816° C.), in an oxidizing or reducing atmosphere. Such heating can occur in the catalytic cracker, in the catalyst regenerator, or in a vessel separate from the catalytic cracker or catalyst regenerator. Thus, the tellurium-containing catalyst can be prepared from used or, preferably, new conventional cracking catalyst by admixing this conventional catalyst with the tellurium treating agent in the presence or absence of a diluent, with removal of the diluent, if employed, with or without heating to an elevated temperature, and the resulting catalyst can be added as make-up catalyst for the cracking process, this make-up catalyst preferably being added to the catalyst regenerator. In a preferred process the tellurium treating agent, as such or as a solution or dispersion in a liquid medium, e.g., mineral oil, is added to the oil feedstock as the feedstock is charged to the catalytic cracker, the treating agent being added at such a rate as to maintain the concentration of tellurium in or on the catalyst within the range of about 0.005 to about 5, preferably about 0.02 to about 2, weight percent, these percentages being based on the weight of cracking catalyst prior to treatment with the tellurium or compound thereof. Less preferably, the tellurium treating agent can be added directly to a stream of catalyst in the cracking process.

In accordance with a further embodiment of this invention, there is provided a process for restoring cracking catalyst by at least partially passivating contaminating metals selected from the group consisting of nickel, vanadium and iron, which process comprises contacting the contaminated cracking catalyst with a tellurium treating agent under elevated temperature.

The time during which the catalyst is contacted with the treating agent is not critical. Generally the time is in the range of from 0.1 to 300 minutes.

As used herein, the term "tellurium treating agent" is intended to include tellurium, as described above.

In accordance with a still further embodiment of this invention, an improved cracking process is provided wherein hydrocarbon feedstock is contacted under cracking conditions with a modified cracking catalyst which comprises a modifying amount of tellurium as defined above. For this embodiment, too, the preferred details concerning the modified cracking catalyst disclosed above apply. Thus, the preferred modified cracking catalyst is one that is obtained by mixing a cracking catalyst with a tellurium treating agent and subjecting the mixture to high temperature conditions.

Advantageously, and in accordance with a still further embodiment of this invention, the tellurium treating agent is added to the feedstock entering the cracking zone, in which it is contacted with cracking catalyst. By this procedure the contacting of the cracking catalyst and the treating agent and the initial treatment under elevated temperatures are done under the reducing conditions prevailing in the catalytic cracker.

The cracking process in which the tellurium-containing cracking catalyst is employed is basically an improvement over a conventional cracking process which employs a conventional cracking catalyst. Although the tellurium-containing cracking catalyst can be employed in a catalytic cracking process employing a fixed catalyst bed, it is especially useful in a fluid catalytic cracking process.

A preferred embodiment of the cracking process of this invention utilizes a cyclic flow of catalyst from a cracking zone to a regeneration zone. In this process, a hydrocarbon feedstock containing contaminating metals such as nickel, vanadium or iron is contacted in a cracking zone under cracking conditions and in the absence of added hydrogen with a tellurium-containing cracking catalyst as defined above; a cracked product is obtained and recovered; the cracking catalyst is passed from the cracking zone into a regeneration zone; and in the regeneration zone the cracking catalyst is regenerated by being contacted with a free oxygen-containing gas, preferably air. The coke that has been built up during the cracking process is thereby at least partially burned off the catalyst. The regenerated cracking catalyst is reintroduced into the cracking zone.

Furthermore, it is preferred in carrying out the cracking process of this invention to replace a fraction of the total cracking catalyst by unused cracking catalyst continuously or intermittently. Generally, about 0.5 to about 6 weight percent of the total cracking catalyst is replaced daily by a fresh cracking catalyst. The actual quantity of the catalyst replaced depends in part upon the nature of the feedstock used. The make-up quantity of cracking catalyst can be added at any location in the process. Preferably, however, the cracking catalyst that is make-up catalyst is introduced into the regeneration zone in a cyclic cracking process.

Also, it is to be understood that the used cracking catalyst coming from the cracking zone, before introduction into the regenerator, is stripped of essentially all entrained liquid or gaseous hydrocarbons. Similarly, the regenerated catalyst can be stripped of any entrained oxygen before it reenters the cracking zone. The stripping is generally done with steam.

The specific conditions in the cracking zone and in the regeneration zone are not critical and depend upon several parameters, such as the feedstock used, the catalyst used, and the results desired. Preferably and most commonly, the cracking and regeneration conditions are within the following ranges:

| Cracking Zone | |
|---|---|
| Temperature: | 800°–1200° F. (427°–649° C.) |
| Time: | 1–40 seconds |
| Pressure: | Subatmospheric to 3000 psig |
| Catalyst:oil ratio: | 3:1 to 30:1, by weight |
| Regeneration Zone | |
| Temperature: | 1000°–1500° F. (538°–816° C.) |
| Time: | 2–40 minutes |
| Pressure: | Subatmospheric to 3000 psig |
| Air at 60° F. (16° C.) and 1 atmosphere: | 100–250 ft$^3$/lb. coke (6.2–15.6 m$^3$/kg coke) |

The feedstocks employed in the catalytic cracking process of this invention contain metal contaminants such as nickel, vanadium and iron. The feedstocks include those which are conventionally utilized in catalytic cracking processes to produce gasoline and light distillate fractions from heavier hydrocarbon feedstocks. The feedstocks have an initial boiling point above about 400° F. (204° C.) and include fluids such as gas oils, fuel oils, topped crudes, shale oils, oils from tar sands, oils from coal, mixtures of two or more of these, and the like. By "topped crude" is meant those oils which are obtained as the bottoms of a crude oil fractionator. If desired, all or a portion of the feedstock can constitute an oil from which a portion of the metal content previously has been removed, e.g., by hydrotreating or solvent extraction.

Typically the feedstock utilized in the process of this invention will contain one or more of the metals nickel, vanadium and iron within the ranges shown in Table I:

TABLE I

| Metal | Metal Content of Feedstocks, ppm[1] |
|---|---|
| Nickel | 0.02 to 100 |
| Vanadium | 0.02 to 500 |
| Iron | 0.02 to 500 |
| Total metals | 0.2 to 1100[2] |

[1]The ppm metal content refers to the feedstock as used. As used in this table and throughout the specification, ppm means parts per million, by weight.
[2]Total metals in this table and elsewhere refers to the sum of the nickel, vanadium and iron contents in the feedstock that are effective in contaminating the catalyst; the total metals content can be determined in accordance with methods well known in the art, e.g., by atomic absorption spectroscopy.

One of the most important embodiments of this invention resides in a heavy oil cracking process. The known commercial heavy oil cracking process is capable of cracking heavy oils having a metals content of up to 80 ppm of total effective metals, i.e., metals in any form detrimental to the cracking process. Economically marginal results are obtained with oils having 40 to 80 ppm of total effective metals. In accordance with this invention, heavy oils with a total metals content of about 40 to 100 ppm and even those of about 100 to 200 ppm and above of total metals can be cracked in a cracking process in the absence of added hydrogen by utilizing the cracking catalyst defined above to yield gasoline and other fuels and fuel blending components. Thus, known heavy oils with total metals contents of from 80 to 300 ppm that heretofore could not be directly used for fuel production and in particular for gasoline or higher-boiling hydrocarbon fuels production in accordance with this invention can be cracked to yield gasoline and higher-boiling hydrocarbon fuels such as kerosene, diesel fuel and burning oils. Most preferably, the concentration of tellurium in or on the tellurium-containing cracking catalyst used in the process of this invention for cracking these heavily metal-loaded oils is related to the average total effective metals content of the feedstock as shown in Table II:

TABLE II

| Total Effective Metals in Feedstock (ppm) | Tellurium Concentration Catalyst, Weight %[1] |
|---|---|
| 40–100 | 0.05–0.9 |
| 100–200 | 0.1–1 |
| 200–300 | 0.15–1.5 |
| 300–800 | 0.2–2 |

[1]Based on weight of catalyst prior to addition of tellurium-containing modifying agent.

The invention will be still more fully understood from the following examples, which are intended to illustrate preferred embodiments of the invention but not to limit the scope thereof.

EXAMPLE I

A commercial cracking catalyst (DZ-7 cracking catalyst from the Davison Chemical Division of W. R. Grace & Company, comprising amorphous silica-alumina associated with zeolitic material) which had been used in a commercial cracking unit and subsequently subjected to regeneration in the laboratory was employed in a series of tests which demonstrated the effectiveness of tellurium in improving a metals-contaminated used cracking catalyst. Properties of the used cracking catalyst prior to regeneration in the laboratory are shown in Table III.

TABLE III

| Surface area, m$^2$/g | 77.7 |
|---|---|
| Pore volume, ml/g | 0.36 |
| Composition, weight % | |
| Aluminum | 18.7 |
| Silicon | 24.9 |
| Nickel | 0.04 |
| Vanadium | 0.15 |
| Iron | 0.29 |
| Cerium | 0.48 |
| Sodium | 0.18 |
| Titanium | 0.45 |
| Potassium | 0.05 |
| Lithium | <0.01 |
| Antimony | <0.01 |
| Carbon | 0.35 |

The used commercial cracking catalyst having the properties shown in Table III was then subjected to regeneration in the laboratory by heating the catalyst while fluidized with air to 1200° F. (649° C.) and maintaining it at that temperature for about 30 minutes while fluidized with air. The catalyst was then cooled to room temperature (about 25° C.) while fluidized with nitrogen, and the resulting regenerated catalyst I was employed as shown below.

A portion, 35.0 g, of the regenerated catalyst I was dry blended with 0.28 g of elemental tellurium powder which had been passed through a 325 mesh screen, and the resulting blend was conditioned in the following manner. The blend was placed in a laboratory-sized, confined fluid bed, quartz reactor, and the reactor was purged with nitrogen. The reactor was then purged with hydrogen, and the blend was heated to 1200° F. (649° C.) while being fluidized with hydrogen. During this heating a yellow deposit formed on the wall of the reactor. The reactor was then purged with nitrogen to remove hydrogen, after which the blend at 1200° F. (649° C.) was fluidized with air for about 15 minutes.

Another portion, 34.0 g, of the regenerated catalyst I, without tellurium, was placed in a laboratory-sized, confined fluid bed, quartz reactor.

Two cracking-regeneration cycles were conducted with the conditioned, tellurium-containing catalyst above before evaluation of the catalyst. Both in these cycles and in the subsequent cycles during evaluation of the catalyst at various catalyst:oil ratios the oil which was subjected to cracking was topped West Texas crude oil. In each cycle the cracking step was carried out at 950° F. (510° C.) and about atmospheric pressure for 0.5 minute and the regeneration step was conducted at about 1200° F. (649° C.) and about atmospheric pressure for approximately 30 minutes using fluidizing air, the reactor being purged with nitrogen before and after each cracking step.

Evaluation of regenerated catalyst I, without tellurium and without conditioning, at various catalyst:oil ratios, was conducted in the same manner as that of the tellurium-containing catalyst except that the evaluation was begun without the two preliminary cracking-regeneration cycles used with the tellurium-containing catalyst. Again, the oil used in the cracking tests was topped West Texas crude oil.

Properties of the topped West Texas crude oil used in the cracking steps are shown in Table IV.

TABLE IV

| | |
|---|---|
| API gravity at 60° F. (16° C.)[1] | 21.4 |
| Distillation, °F. (°C.)[2] | |
| IBP | 556 (291) |
| 10% | 803 (428) |
| 20% | 875 (468) |
| 30% | 929 (498) |
| 40% | 982 (528) |
| 50% | 1031 (555) |
| Carbon residue, Rams, wt. %[3] | 5.5 |
| Elemental analysis | |

TABLE IV-continued

| | |
|---|---|
| S, wt. % | 1.2 |
| Ni, ppm | 5.24 |
| V, ppm | 5.29 |
| Fe, ppm | 29 |
| Pour point, °F. (°C.)[4] | 63 (17) |
| Kinematic viscosity, cSt[5] | |
| at 180° F. (82° C.) | 56.5 |
| at 210° F. (99° C.) | |
| Refractive index at 67° C.[6] | 1.5 |

[1]ASTM D 287-67
[2]ASTM D 1160-61
[3]ASTM D 524-64
[4]ASTM D 97-66
[5]ASTM D 445-65
[6]ASTM D 1747-62

The results of the cracking tests conducted with the two catalysts, at various catalyst:oil ratios, are summarized in Table V. Also shown in Table V is the octane number, determined by the method of *Journal of the Institute of Petroleum,* volume 58, No. 560 (March 1972), for the gasoline fraction obtained in each cracking test.

TABLE V

| Cracking test[1] | Catalyst without Tellurium Added | | | Catalyst with Tellurium Added | | | | |
|---|---|---|---|---|---|---|---|---|
| | 1a | 2a | 3a | 3b | 4b | 1b | 5b | 2b |
| Catalyst:oil wt. ratio | 5.02 | 5.87 | 6.50 | 4.76 | 5.39 | 6.05 | 7.06 | 8.24 |
| Conversion, vol. % of feed | 72.5 | 76.1 | 78.5 | 72.7 | 80.3 | 80.5 | 81.8 | 84.9 |
| Gasoline, vol. % of feed | 61.1 | 62.7 | 64.7 | 67.3 | 67.9 | 64.0 | 61.7 | 63.4 |
| Gasoline, octane number | 88.45 | 89.00 | 89.34 | 88.98 | 88.93 | 89.50 | 89.38 | 89.87 |
| Coke, wt. % of feed | 10.2 | 10.7 | 11.6 | 11.5 | 11.7 | 11.4 | 12.3 | 13.1 |
| H$_2$, SCF/bbl feed converted | 120 | 130 | 140 | 94 | 111 | 82 | 158 | 129 |

[1]Cracking tests are numbered in the order in which tests were conducted at the various catalyst:oil ratios.

As indicated in Table V, at a given catalyst:oil weight ratio the tellurium-containing catalyst was more active than the catalyst without tellurium added. Also, at the lower catalyst:oil ratios use of the tellurium-containing catalyst resulted in the production of more gasoline and less hydrogen than did use of the catalyst without hydrogen added. At the higher catalyst:oil ratios overcracking of the feedstock occurred, under the conditions used, when the tellurium-containing catalyst was employed, due to the relatively high activity of this catalyst. The octane number of the gasoline produced by use of the tellurium-containing catalyst was at least as high as that of the gasoline produced by use of the catalyst without tellurium added.

EXAMPLE II

This calculated example is given to indicate how the invention can be operated in plant scale. In a commercial cracking unit containing 200 tons of cracking catalyst, 24,300 bbl/day of oil having an API gravity of 20.8 are cracked. In order to build up a level of 0.5 weight percent (based on untreated cracking catalyst) of tellurium on the cracking catalyst, elemental tellurium dispersed in mineral oil is added in a quantity of 20 ppm of tellurium to the feedstock for 17 days or of 30 ppm of tellurium to the feedstock for 10 days. In order to keep the tellurium level at 0.5 weight percent, the rate of addition has to be 10 ppm of tellurium in case 8 tons of catalyst per day are withdrawn from the reactor and replaced by untreated catalyst. In case only 6 tons of catalyst per day are replaced, this addition would be sufficient to keep the tellurium level of the catalyst system at 0.65 weight percent. In absolute figures this means that 2175 pounds of a mineral oil dispersion of elemental tellurium, this dispersion having a tellurium content of 11 weight percent, has to be added, per day, to the feedstock for 10 days (1450 pounds, per day, for 17 days), and that 725 pounds of this mineral oil dispersion of elemental tellurium has to be added, per day, to the feedstock to maintain the desired level of tellurium on the catalyst at 0.5 weight percent.

Reasonable variations and modifications, which will be apparent to those skilled in the art, can be made in this invention without departing from the spirit and scope thereof.

What is claimed is:

1. A process for cracking a hydrocarbon feedstock which comprises contacting said hydrocarbon feedstock containing metal contaminants with a cracking catalyst under cracking conditions and in the absence of added hydrogen wherein said cracking catalyst has been modified with a modifying amount of at least one treating agent selected from the group consisting of elemental tellurium, oxides of tellurium and compounds convertible to elemental tellurium or oxide thereof during cracking or catalyst regeneration.

2. A process according to claim 1 wherein said cracking catalyst contains said treating agent in an amount such as to provide in the range of from about 0.005 to about 5 parts by weight tellurium per 100 parts by weight of said cracking catalyst prior to being contacted with said treating agent.

3. A process according to claim 1 wherein said cracking catalyst is a used cracking catalyst.

4. A process according to claim 3 wherein said used cracking catalyst has an at least partially deactivating amount of one or more of the metals nickel, iron and vanadium deposited thereon.

5. A process according to claim 1 wherein said cracking catalyst is an unused cracking catalyst.

6. A process according to claim 1 wherein said cracking catalyst is a mixture of used and unused cracking catalyst.

7. A process according to claim 1 wherein said treating agent is added to said catalyst prior to contacting thereof with said hydrocarbon feedstock.

8. A process according to claim 1 wherein said treating agent is added to said catalyst by addition thereof to said hydrocarbon feedstock prior to contacting said cracking catalyst.

9. In a cracking process comprising (a) introducing a hydrocarbon feedstock stream containing metal contaminants into a cracking zone, (b) contacting the hydrocarbon feedstock stream in said cracking zone with a cracking catalyst in the absence of added hydrogen under elevated temperature conditions to produce a cracked product, (c) withdrawing said cracked product from said cracking zone, (d) separating said cracked product from said catalyst, (e) introducing said catalyst into a regeneration zone with free oxygen-containing gas such as to burn off at least a portion of the coke deposited on said cracking catalyst and reintroducing the thus regenerated catalyst into the cracking zone, the improvement which comprises contacting said cracking catalyst with a modifying amount of at least one treating agent selected from the group consisting of elemental tellurium, oxides of tellurium and compounds convertible to elemental tellurium or oxide thereof during cracking or catalyst regeneration.

10. A process according to claim 9 wherein said treating agent is added in an amount such as to provide in the range of from about 0.005 to about 5 parts by weight tellurium per 100 parts by weight of said cracking catalyst prior to being contacted with said treating agent.

11. A process according to claim 10 wherein said cracking catalyst is contacted under elevated temperature conditions and under reducing conditions with said treating agent.

12. A process according to claim 9 wherein said contacting of said cracking catalyst is effected by addition of said treating agent to said hydrocarbon feedstock.

13. A process according to claim 9 wherein said treating agent is admixed with said regenerated catalyst prior to introduction thereof into said cracking zone.

14. A process according to claim 9 wherein said treating agent is deposited on unused cracking catalyst and the resulting composition is introduced into said regeneration zone.

15. A process according to claim 9 wherein said treating agent is elemental tellurium.

16. A process according to claim 9 wherein said hydrocarbon feedstock is a heavy oil.

17. A process according to claim 16 wherein said heavy oil has from 40 to 800 ppm metals therein.

* * * * *